United States Patent
Sasaki

(10) Patent No.: US 9,835,514 B2
(45) Date of Patent: Dec. 5, 2017

(54) DEVICE AND METHOD FOR DETERMINING KNOCK IN AN INTERNAL COMBUSTION ENGINE

(75) Inventor: Yuji Sasaki, Ebina (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 1179 days.

(21) Appl. No.: 12/972,645

(22) Filed: Dec. 20, 2010

(65) Prior Publication Data

US 2011/0153182 A1 Jun. 23, 2011

(30) Foreign Application Priority Data

Dec. 22, 2009 (JP) ................................ 2009-290209

(51) Int. Cl.
*G01L 23/22* (2006.01)
*F02D 35/02* (2006.01)
(Continued)

(52) U.S. Cl.
CPC .......... *G01L 23/221* (2013.01); *F02D 35/027* (2013.01); *F02P 5/152* (2013.01);
(Continued)

(58) Field of Classification Search
CPC ............. F02D 2041/288; F02D 35/027; G01L 23/22–23/227; G01L 2023/228; F02P 5/152; F02P 5/1514
(Continued)

(56) References Cited

U.S. PATENT DOCUMENTS 4,356,551 A * 10/1982 Iwase .................... F02P 5/1522
                                                                  123/435
4,476,709 A * 10/1984 Hattori .................. G01L 23/225
                                                                  73/35.05
(Continued)

FOREIGN PATENT DOCUMENTS

DE     EP 1664508 B1 *  4/2008    ........... F02D 35/027
JP     2005-171900        6/2005
(Continued)

*Primary Examiner* — Mahmoud Gimie
*Assistant Examiner* — Josh Campbell
(74) *Attorney, Agent, or Firm* — Drinker Biddle & Reath LLP

(57) ABSTRACT

An internal combustion engine knock determining device includes a vibration detector that produces a signal corresponding to engine vibration, an intensity computing unit that retrieves vibrational components in a plurality of frequency regions in which vibration intensity peaks are located when knock occurs, a background-noise computing unit that calculates background noise caused by factors other than knock, a frequency computing unit that determines specific frequency regions from which to determine whether knock is occurring by excluding certain frequency regions designated as frequency regions requiring exclusion due to the intensity of false-detection causing noise as a proportion of the background noise in the certain regions, and a knock determining unit that determines the occurrence of knock based on the vibration intensity in the specific frequency regions obtained by excluding the frequency regions requiring exclusion, wherein the number of specific frequency regions is increased to improve the accuracy of knock detection.

18 Claims, 8 Drawing Sheets

(51) Int. Cl.
*F02P 5/152* (2006.01)
*F02D 41/14* (2006.01)
*F02D 41/28* (2006.01)

(52) U.S. Cl.
CPC ........... *F02D 2041/1432* (2013.01); *F02D 2041/288* (2013.01); *F02D 2200/025* (2013.01); *Y02T 10/46* (2013.01)

(58) Field of Classification Search
USPC .............. 701/111; 73/35.01, 35.07, 35.09; 123/406.26
See application file for complete search history.

(56) References Cited

U.S. PATENT DOCUMENTS

| | | | | |
|---|---|---|---|---|
| 4,782,795 A * | 11/1988 | Kubozuka | ............ | F01P 3/2285 123/406.35 |
| 5,230,316 A * | 7/1993 | Ichihara | ............ | G01L 23/225 123/406.38 |
| 5,608,633 A * | 3/1997 | Okada | ............ | G01L 23/225 123/406.38 |
| 5,900,536 A * | 5/1999 | Mogi | ............ | F02P 17/12 73/35.03 |
| 6,196,184 B1 * | 3/2001 | Przymusinski | ......... | F02D 41/22 123/299 |
| 6,246,953 B1 * | 6/2001 | Quinn et al. | ............ | 701/111 |
| 7,222,607 B2 * | 5/2007 | Hernandez | ............ | F02P 5/1526 123/406.37 |
| 2006/0144365 A1 * | 7/2006 | Miyashita | ............ | G01L 23/225 123/431 |
| 2007/0185642 A1 * | 8/2007 | Grai | ............ | F02D 35/021 701/111 |
| 2007/0214869 A1 * | 9/2007 | Kaneko | ............ | G01L 23/225 73/35.09 |
| 2008/0257018 A1 * | 10/2008 | Inada | ............ | G01L 23/225 73/35.08 |
| 2009/0112449 A1 * | 4/2009 | Binder | ............ | F02D 35/02 701/111 |

FOREIGN PATENT DOCUMENTS

| | | |
|---|---|---|
| JP | 2008-095602 | 4/2008 |
| JP | 2009-24641 | 2/2009 |

* cited by examiner

FIG. 4

| VIBRATION MODE | | ⊕⊖ | ⊕⊖/⊖⊕ | ✳ | ⊙⊖ | ⊖⊕⊖ |
|---|---|---|---|---|---|---|
| | n | 1 | 2 | 3 | 0 | 1 |
| | m | 0 | 0 | 0 | 1 | 1 |
| | U'nm | 1.841 | 3.054 | 4.201 | 3.832 | 5.332 |
| f(kHz) | | 4.81 | 7.97 | 10.97 | 10.01 | 13.93 |

DEVICE AND METHOD FOR DETERMINING KNOCK IN AN INTERNAL COMBUSTION ENGINE

CROSS-REFERENCE TO RELATED APPLICATIONS

This application claims priority under 35 U.S.C. §119 to Japanese Patent Application No. 2009-290209, filed on Dec. 22, 2009, which is incorporated by reference herein in its entirety.

BACKGROUND OF THE INVENTION

Field of Invention

The present invention relates to devices and methods for determining knock in internal combustion engines.

Description of Related Art

In general, a knock determining device for an internal combustion engine determines the occurrence of knock on the basis of peak positions or peak intensities of vibration waveforms detected by a knock sensor for detecting vibration of a cylinder block.

However, it is difficult to discriminate between knock and noise and to accurately detect knock since various types of background engine noise, for example, noise generated when fuel injection valves are seated or the driving noise of an adjustable valve device, are generated in an internal combustion engine.

To solve this problem, an existing device determines the occurrence of knock based on peak intensities in specific frequency bands by excluding those frequency bands in which the background engine noise occurs, including the noise of fuel injection valves, to obtain a subset of the specific frequency bands in which peaks exist when knock occurs but not when other driving noise occurs. As a result, noise generated when the fuel injection valves are seated, for example, is prevented from being falsely detected as knock. However, when knock occurs having peaks in frequency bands other than the specific frequency bands, and particularly in frequency bands that were excluded due to the presence of engine noise, the occurrence of knock cannot be detected by such a device. That is, the knock detection performance is disadvantageously reduced compared with the case where the specific frequency bands are not limited by the exclusion of those frequency bands in which background engine noise occurs.

SUMMARY OF THE INVENTION

The present invention provides a device and a method for determining knock capable of determining the occurrence of knock by maximizing the number of specific frequency bands used in the determination while avoiding false determinations of knock as a result of engine noise such as the seating noise of fuel injection valves.

An embodiment of a knock determining device of an internal combustion engine is disclosed, the device including a vibration detector that detects vibration of the internal combustion engine and produces a signal corresponding to the vibration, an intensity computing unit that retrieves from the signal vibrational components in a plurality of frequency regions in which peaks of vibration intensity are located when knock occurs, and a background-noise computing unit that calculates background noise detected as vibration by the vibration detector that is caused by factors other than knock. The device further includes a frequency computing unit that determines a number of specific frequency regions from which to determine whether knock is occurring by excluding from the plurality of frequency regions certain frequency regions designated as frequency regions requiring exclusion due to the intensity of false-detection causing noise as a proportion of the background noise of the engine in the certain regions and a knock determining unit that determines the occurrence of knock based on the vibration intensity in the specific frequency regions obtained by excluding the frequency regions requiring exclusion. The number of specific frequency regions is increased as the false-detection causing noise as a proportion of the background noise is decreased by limiting the frequency regions requiring exclusion to those of the plurality of frequency regions in which the false-detection causing noise causes an intensity of vibration in the background noise in a range that impairs the ability to detect knock.

An embodiment of a method for determining knock in an internal combustion engine is disclosed, the method including detecting vibration of the internal combustion engine and producing a signal corresponding to the vibration, retrieving from the signal vibrational components in a plurality of frequency regions in which peaks of vibration intensity are located when knock occurs, calculating background noise detected as vibration that is caused by factors other than knock, and determining the occurrence of knock based vibration intensity in specific frequency regions obtained by excluding from the plurality of frequency regions certain frequency regions designated as frequency regions requiring exclusion due to the intensity of false-detection causing noise as a proportion of the background noise of the engine in the certain regions. The number of specific frequency regions is increased as the false-detection causing noise as a proportion of the background noise is decreased by limiting the frequency regions requiring exclusion to those of the plurality of frequency regions in which the false-detection causing noise causes an intensity of vibration in the background noise in a range that impairs the ability to detect knock.

Another embodiment of a knock determining device of an internal combustion engine is disclosed, the device including vibration detecting means for detecting vibration of the internal combustion engine and producing a signal corresponding to the vibration, retrieving means for retrieving from the signal vibrational components in a plurality of frequency regions in which peaks of vibration intensity are located when knock occurs, background-noise computing means for calculating background noise detected as vibration by the vibration detection means that is caused by factors other than knock, frequency computing means for determining a number of specific frequency regions from which to determine whether knock is occurring by excluding from the plurality of frequency regions certain frequency regions designated as frequency regions requiring exclusion due to the intensity of false-detection causing noise as a proportion of the background noise of the engine in the certain regions, and knock determining means for determining the occurrence of knock based on the vibration intensity in the specific frequency regions obtained by excluding the frequency regions requiring exclusion. The number of specific frequency regions is increased as the false-detection causing noise as a proportion of the background noise is decreased by limiting the frequency regions requiring exclusion to those of the plurality of frequency regions in which the false-detection causing noise causes an intensity of vibration in the background noise in a range that impairs the ability to detect knock.

According to the present invention, the possibility of incorrectly determining that no knock is occurring even when knock is actually occurring is reduced since specific frequency bands of detection are not excluded more than necessary. As a result, knock can be detected with high accuracy.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 4 illustrates vibration modes when knock occurs;

DETAILED DESCRIPTION OF THE PREFERRED EMBODIMENTS

Figure 1:
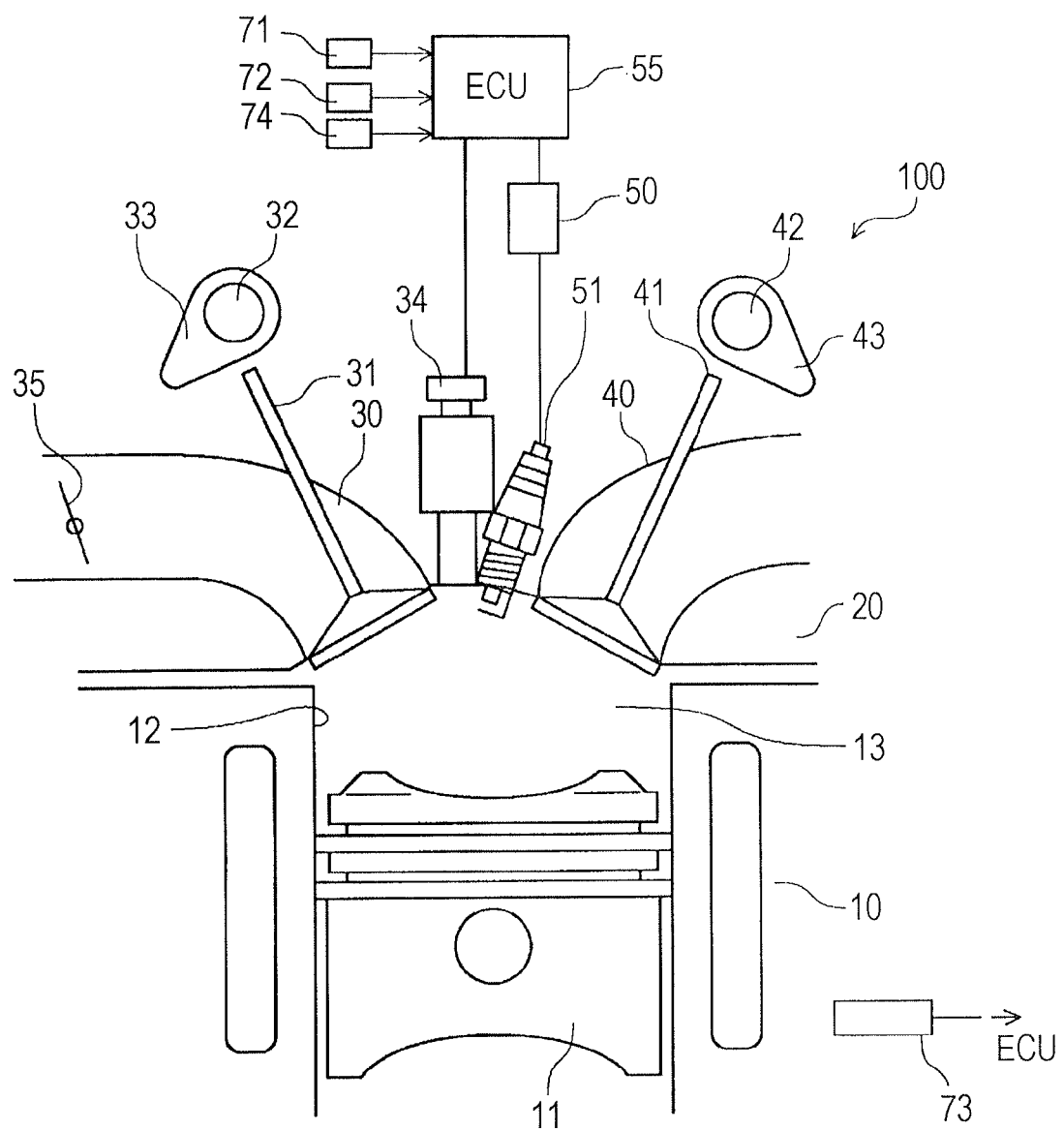
FIG. 1 is a schematic view of an embodiment of an internal combustion engine.

An embodiment of the present invention will now be described with reference to the drawings. FIG. 1 is a schematic view of an internal combustion engine into which the embodiment is incorporated.

An internal combustion engine 100 includes a cylinder block 10 and a cylinder head 20 disposed above the cylinder block 10. Cylinders 12 are formed in the cylinder block 10, and each accommodate a piston 11. The crown surfaces of the pistons 11, the walls of the cylinders 12, and the bottom surface of the cylinder head 20 form combustion chambers 13. When a fuel-air mixture burns in the combustion chambers 13, the pistons 11 reciprocate in the respective cylinders 12 due to combustion pressure generated by the burning.

Intake paths 30 through which the fuel-air mixture flows into the respective combustion chambers 13 and exhaust paths 40 through which the exhaust gas is discharged from the respective combustion chambers 13 are formed in the cylinder head 20. Each intake path 30 is provided with an intake valve 31. The intake valve 31 is driven by a cam 33 integrated with an intake camshaft 32. The cam 33 opens or closes the intake path 30 in response to the vertical motion of the piston 11. Each intake path 30 is also provided with a throttle valve 35. The throttle valve 35 opens or closes on the basis of a signal output from a controller 55 (described below), and adjusts the cross-sectional area of the flow channel of the intake path 30. Each exhaust path 40 is provided with an exhaust valve 41. The exhaust valve 41 is driven by a cam 43 integrated with an exhaust camshaft 42. The cam 42 opens or closes the exhaust path 40 in response to the vertical motion of the piston 11.

A fuel injection valve 34 and a spark plug 51 are disposed on the cylinder head 20 between each set of the intake paths 30 and the exhaust paths 40 at the central portion of the corresponding combustion chamber 13 so as to face the combustion chamber 13. The ignition timing of the spark plugs 51 is controlled by an ignition controller 50 on the basis of signals output from the controller 55.

The controller 55 includes a CPU, a ROM, a RAM and an I/O interface. The controller 55 receives outputs from various sensors that detect the operating state of the engine such as the rotational speed and the engine load. The rotational speed of the engine is detected by crank angle sensors 71. The engine load is calculated on the basis of the throttle opening, and the throttle opening is detected by a throttle position sensor 72. The controller 55 determines the fuel-injection timing, the ignition timing, and the like on the basis of output from these various sensors. In addition, the controller 55 receives a signal detected by a knock sensor 73 disposed so as to be able to detect the vibration of the cylinder block 10. The controller 55 determines the occurrence of knock on the basis of the signal detected by the knock sensor 73.

Next, determination of the occurrence of knock (knock determination) performed by the controller 55 will be described.

Figure 2:
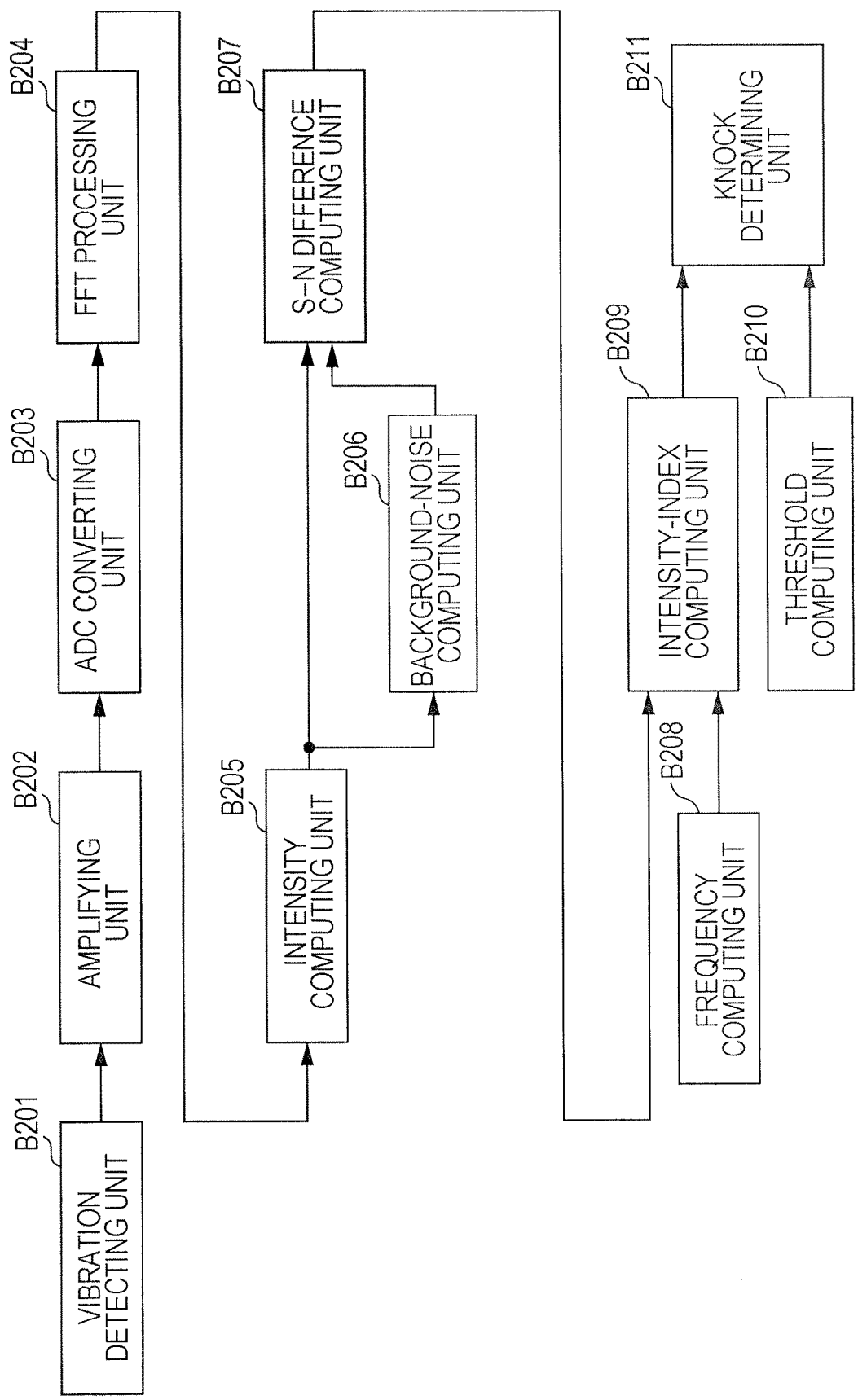
FIG. 2 is a block diagram illustrating the contents of a knock determination control.

FIG. 2 is a block diagram illustrating the knock determination control performed by the controller 55. The controller 55 repeatedly performs this control at a constant period (for example, ten milliseconds). The blocks shown in this drawing indicate functions of the controller 55 as virtual units, and do not necessarily physically exist.

A vibration detecting unit B201 receives the signal from the knock sensor 73 that detects the vibration of the cylinders. An amplifying unit B202 amplifies the received signal. An ADC converting unit B203 converts the amplified signal from an analog signal to a digital signal. An FFT processing unit B204 converts the digital signal converted at the ADC converting unit B203 into frequency components using fast Fourier transform (FFT processing).

An intensity computing unit B205 outputs the signal after FFT processing in terms of frequency for each cylinder. A background noise computing unit B206 computes background noise such as noise generated when the fuel injection valves 34 are seated during operation of the engine 100 (i.e., noise of the fuel injection valves 34) and noise caused by mechanical operation of the internal combustion engine 100 itself.

An S-N difference computing unit B207 computes differences between the frequency components calculated at the intensity computing unit B205 in terms of frequency for each cylinder and the weighted average of the background noise calculated at the background noise computing unit B206 (S-N differences). The weighted average can be obtained by, for example, averaging the calculated frequency components to which weight of 80 percent is assigned and the calculated background noise to which weight of 20 percent is assigned.

A frequency computing unit B208 selects frequency regions used for knock determination (described below). An intensity-index computing unit B209 integrates the S-N differences in the frequency regions selected at the frequency computing unit B208, and computes an intensity index used for knock determination for each cylinder. A threshold computing unit B210 computes a threshold used for knock determination for each cylinder.

A knock determining unit B211 determines the occurrence of knock by comparing the intensity index computed at the intensity index computing unit B209 with the threshold computed at the threshold computing unit B210 for each cylinder.

Figure 3:
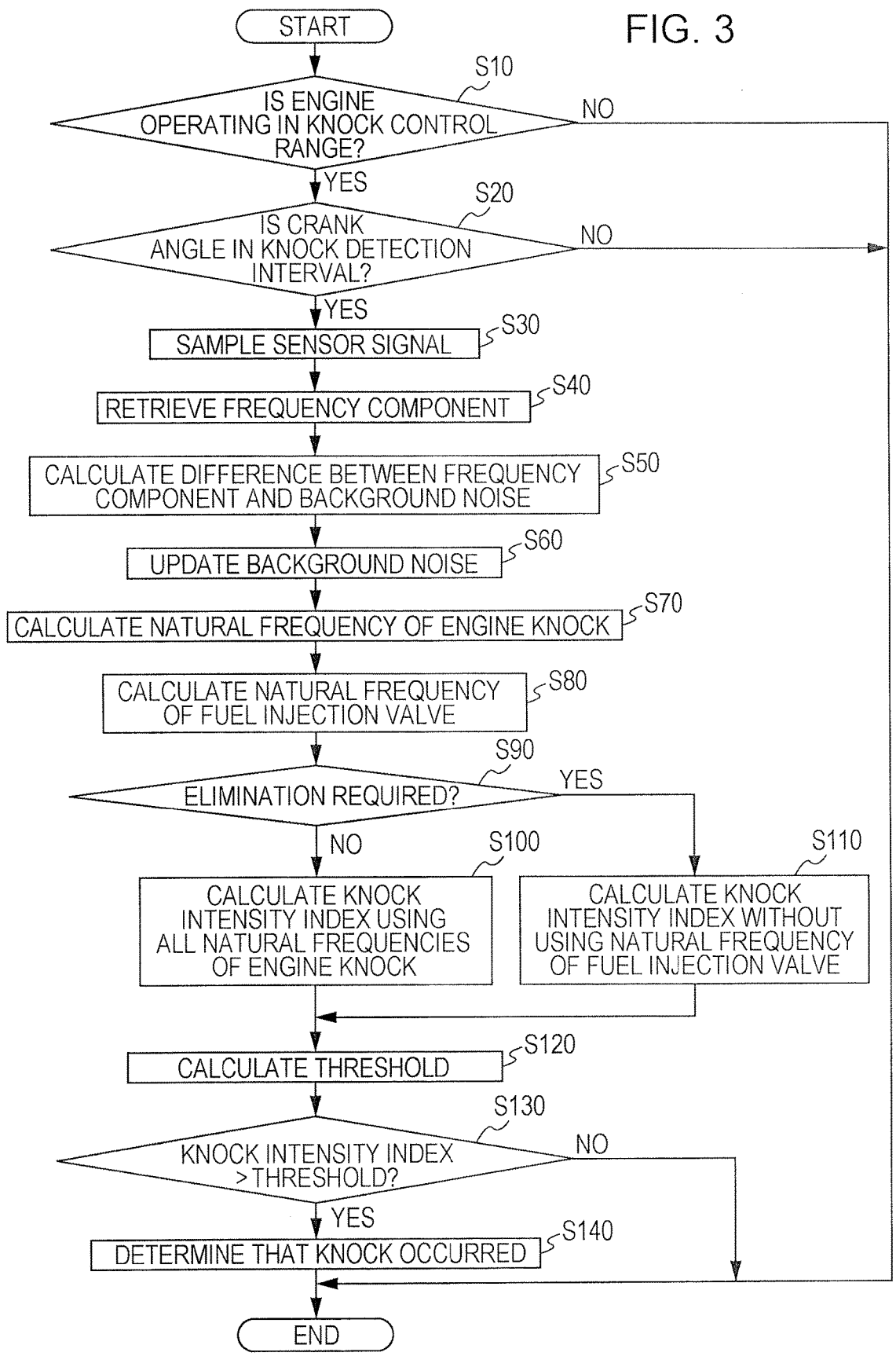
FIG. 3 is a flow chart illustrating the control routine of the knock determination control of FIG. 2.

FIG. 3 is a flow chart illustrating specific contents of the process of the knock determination control. In Step S10, it is determined whether or not the engine is currently operating in an operating range in which knock may occur (knock control range). It is determined that the engine is operating in the knock control range when the temperature of the engine cooling water is higher than or equal to a threshold temperature, for example, 60° C., based on a value detected by a water temperature sensor 74. When the engine is operating in the knock control range, the process proceeds to Step S20. When the engine is operating outside the knock control range, the process ends without performing any operations since knock detection is not necessary.

In Step S20, it is determined whether or not the current crank angles are in a knock detection interval. When the crank angles are in the knock detection interval, the process proceeds to Step S30, otherwise the process ends. The knock detection interval is an interval in which the in-cylinder vibration is detected by the knock sensor 73. Generally, in-cylinder vibration due to knock occurs while a piston is located between a top dead center on the compression stroke and the vicinity of the crank angle of 60° ATDC on the power stroke. Therefore, the in-cylinder vibration needs to be detected by the knock sensor 73 only in this interval of piston timing. Conversely, if the in-cylinder vibration were to be detected at piston timings outside this interval, vibration caused by factors other than knock could be falsely determined as knock. Therefore, a crank-angle range from about 0° ATDC to about 60° ATDC is defined as the knock detection interval, and the in-cylinder vibration is detected by the knock sensor 73 only when the crank angle is within this interval.

The processes after Step S20 are performed for each cylinder. In Step S30, the signal produced by the knock sensor 73 is sampled. More specifically, the signal produced by the knock sensor 73 is amplified at the amplify unit B202, and sampled as a digital signal by the ADC converting unit B203. In Step S40, the sampled signal is converted into frequency components using FFT (B204), and is output in terms of frequency for each cylinder (B205).

In Step S50, differences between the frequency components calculated in Step S40 and the background noise calculated in terms of frequency are calculated (B207). The background noise is updated in Step S60 (described below) as required, and the last updated background noise is used. For the first computation upon startup, the result obtained by subtracting the background noise from the frequency components is defined as zero.

In Step S60, the weighted average of the frequency components calculated in Step S40 and the last updated background noise is calculated, and is set as a new background noise (B206). The weighted average can be obtained by, for example, averaging the calculated frequency components to which weight of 80 percent is assigned and the last updated background noise to which weight of 20 percent is assigned.

In Step S70, frequencies at which vibration peaks occur due to knock (natural frequencies of engine knock). At the occurrence of knock, the inside of the cylinder vibrates in one of the modes or in a combination of some of the modes shown in FIG. 4. The natural frequency of engine knock for each mode can be calculated using Draper's theoretical formula:

$$f = U_{nm} \cdot C / \pi B$$

where f is the natural frequency of engine knock, B is the cylinder bore, C is the speed of sound, $U_{nm}$ is the characteristic value, n is the order in the radial direction, and m is the order in the circumferential direction.

In Step S80, the natural frequency of the driving noise of the fuel injection valve 34 included in the background noise is calculated. A numerical value representing the driving noise of the fuel injection valve 34 is measured by experiments prior to operation of the valve and stored in the controller 55 in advance, and is read during the calculation.

In Step S90, it is determined whether or not the current operating range requires the exclusion of the driving noise of the fuel injection valve 34. This determination is conducted as described below. When no exclusion is required, the process proceeds to Step S100, and the knock intensity index is calculated using the signal levels of the all of the natural frequencies of engine knock. The knock intensity index is the average of the differences calculated in Step S50. On the other hand, when exclusion is required, the process proceeds to Step S110, and the knock intensity index is calculated as the average of the difference calculated in Step S50 for specific frequencies obtained by excluding the natural frequency of the fuel injection valve 34 from the natural frequencies of engine knock.

Next, the processes in Steps S90 to S110 will be described in detail. When the timings at which the fuel injection valve 34 opens or closes are within the knock detection interval, the driving noise of the fuel injection valve 34 may be falsely detected as vibration due to knock since the driving noise of the fuel injection valve 34 is generated at a frequency at or near a natural frequency of engine knock. That is, the driving noise of the fuel injection valve 34 may become a significant false-detection causing noise as a component of the background noise which could result in false detection of knock when no knock is occurring. Such false detection can be prevented by excluding from the specific frequencies used to determine knock the natural frequency of engine knock in the vicinity of the false-detection causing background noise, that is, the natural frequency of the fuel injection valve 34. However, reducing the number of specific frequencies used to determine knock increases the risk that it will be determined that no knock is occurring even when knock is actually occurring. This disadvantageously reduces the reliability of knock detection.

Moreover, the cylinder randomly vibrates at a frequency among the five natural frequencies of engine knock when knock actually occurs. Therefore, the occurrence of knock cannot be detected when the natural frequency of engine knock in the vicinity of the natural frequency of the fuel injection valve 34 is excluded from the specific frequencies from which knock is to be determined and the cylinder vibrates only in the mode of the frequency in the vicinity of the natural frequency of the fuel injection valve 34.

Therefore, it is determined whether or not the natural frequency of the fuel injection valve 34 needs to be excluded first from the specific frequencies from which knock is to be determined. The occurrence of knock is defined as a state where knock sound is audible, that is, a state where the vibration generated by knock is detected by the knock sensor 73 as equal to or greater than that of the vibration caused by background noise. Consequently, the driving noise of the fuel injection valve 34 is not falsely detected as knock in an operating range where there is no difference between the background noise with the driving noise of the fuel injection valve 34 and the background without the driving noise of the fuel injection valve 34, that is, in an operating range where the proportion of the driving noise of the fuel injection valve 34 out of the entire background noise is small even when the natural frequency of the fuel injection valve 34 is not excluded.

Such an operating range is defined as a range not requiring exclusion. As used herein, there is "no difference" between the background noise with the driving noise of the fuel injection valve 34 and that without the driving noise when the engine is operating in an operating range in which noise caused by, for example, mechanical operations of the internal combustion engine 100 itself is large enough to drown out the driving noise of the fuel injection valve 34. Such an operating range includes, for example, a high rotational speed range or a high load range.

The definition of "no difference" herein is not limited to the case where the signal levels are exactly the same, but rather when the signal levels are within a range that does not impair the ability to detect knock. The signal level difference between the signals of the background noise with and without the driving noise of the fuel injection valve 34 that can be considered as "no difference" can be set to optimize knock detectability. For example, when the signal level with the driving noise of the fuel injection valve 34 is up to about four times the signal level without the driving noise, the level difference can be considered to be "no difference" without reducing the knock detectability.

On the other hand, when the proportion of the driving noise of the fuel injection valve 34 out of the entire background noise is large but in only a certain frequency region, false detection can be similarly prevented by excluding only the certain frequency region. That is, when the engine is operating in an operating range in which the background noise with the driving noise of the fuel injection valve 34 is far larger than the background noise without the driving noise, the driving noise of the fuel injection valve 34 may be falsely determined as vibration caused by knock. Therefore, the natural frequency of the fuel injection valve 34 is in a range that impairs the ability to detect knock and needs to be excluded. Such an operating range is defined as a range requiring exclusion.

The determination whether or not the operating range requires exclusion is performed as follows. The background noise without the driving noise of the fuel injection valve 34 is compared with the background noise with the driving noise of the fuel injection valve 34 at a particular rotational speed and load of the internal combustion engine 100 while no knock is occurring. When there is no difference between the background noises, it is determined that the rotational speed and the load are in the range not requiring exclusion, and otherwise it is determined that the rotational speed and the load are in the range requiring exclusion.

Figure 5:
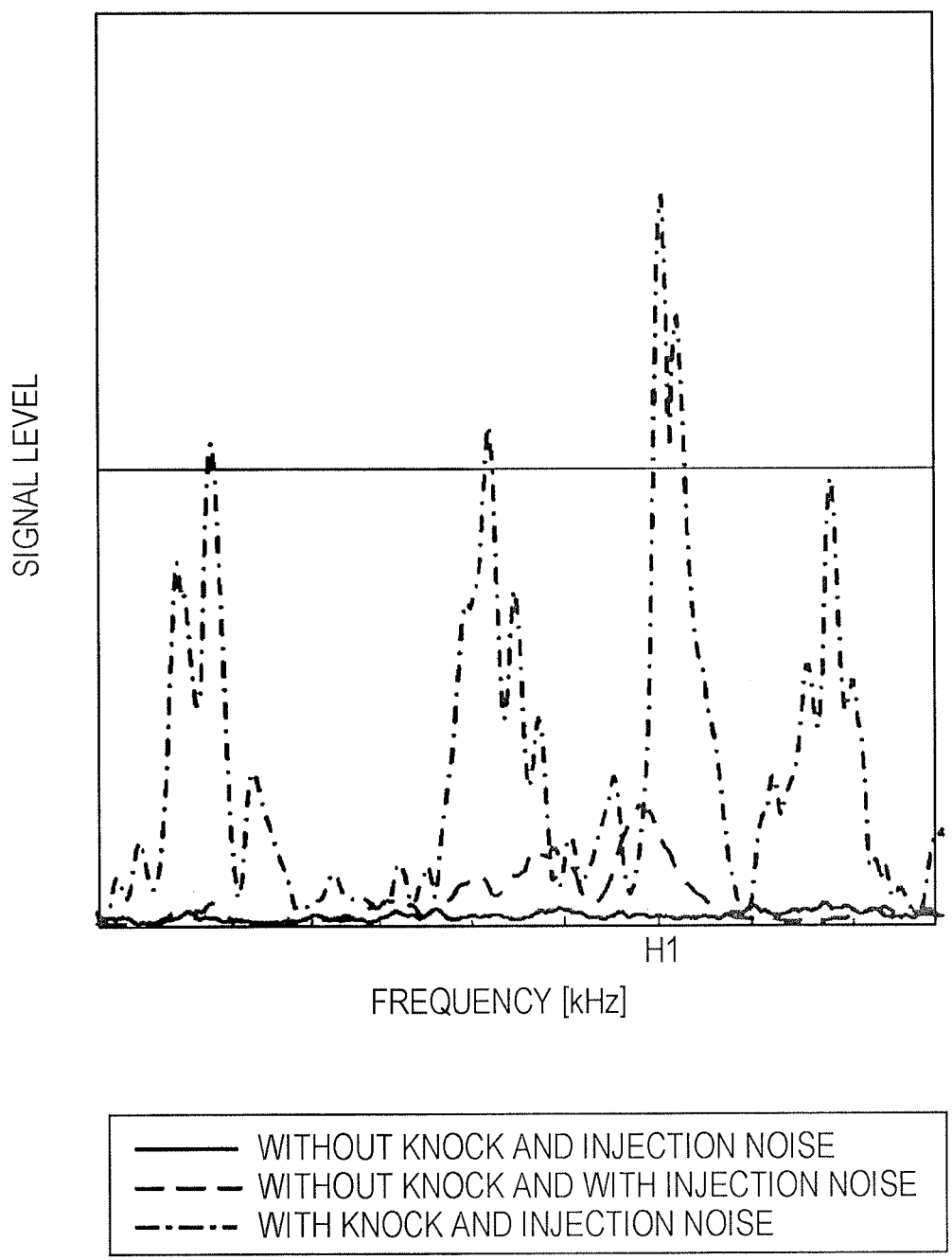
FIG. 5 illustrates exemplary differences in background noise caused by the presence or absence of the driving noise of a fuel injection valve.

For example, FIG. 5 illustrates signal levels of background noises at the rotational speed of 2,000 rpm during full-load operation (at wide-open throttle; WOT). In the drawing, a solid line indicates the signal level of the background noise without knock and the driving noise of the fuel injection valve 34, a broken line indicates the signal level of the background noise without knock and with the driving noise of the fuel injection valve 34, and an alternate long and short dash line indicates the signal level of the background noise with knock and the driving noise of the fuel injection valve 34. Herein, the signal level without knock and with the driving noise of the fuel injection valve 34 (broken line) is higher than the signal level without knock and the driving noise (solid line) in the vicinity of in particular, a frequency H1. In addition, a peak caused by knock exists in the vicinity of the frequency H1. Therefore, the peak of the driving noise of the fuel injection valve 34 in the vicinity of the frequency H1 may be falsely determined as that caused by knock. Accordingly, the operating range is defined as a range requiring exclusion. Knock can be detected almost reliably even when the peak in the vicinity of the frequency H1 is excluded since the signal level with knock averaged over a plurality of combustion cycles generally includes peaks caused by knock over a plurality of frequencies as described above.

Figure 6:
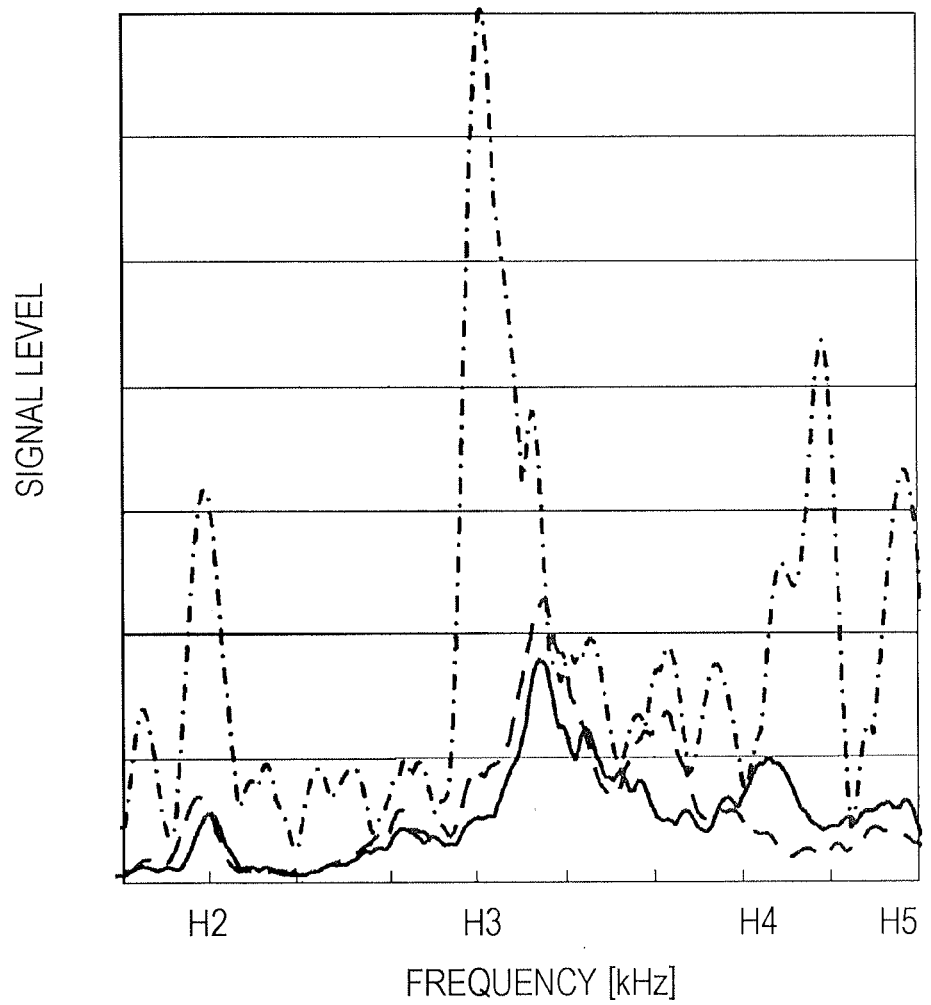
FIG. 6 illustrates other exemplary differences in the background noise caused by the presence or absence of the driving noise of the fuel injection valve.

Similarly to FIG. 5, FIG. 6 illustrates signal levels at the rotational speed of 4,000 rpm during full-load operation. In this operating range, there is little difference in level between the signals with and without the driving noise of the fuel injection valve 34 in the vicinity of frequencies H2 to H5 in which peaks caused by knock exist. Therefore, the operating range is defined as a range not requiring exclusion.

The difference in level between the signals with and without the driving noise of the fuel injection valve 34 is negligible when the engine is operating in an operating range in which noise, for example, caused by mechanical operations of the internal combustion engine 100 itself is large enough to drown out the driving noise of the fuel injection valve 34. Therefore, the amplitude of the background noise can be simply set as a criterion, and it can be determined that the operating range is a range not requiring exclusion when the amplitude of the background noise exceeds a predetermined level.

Figure 7:
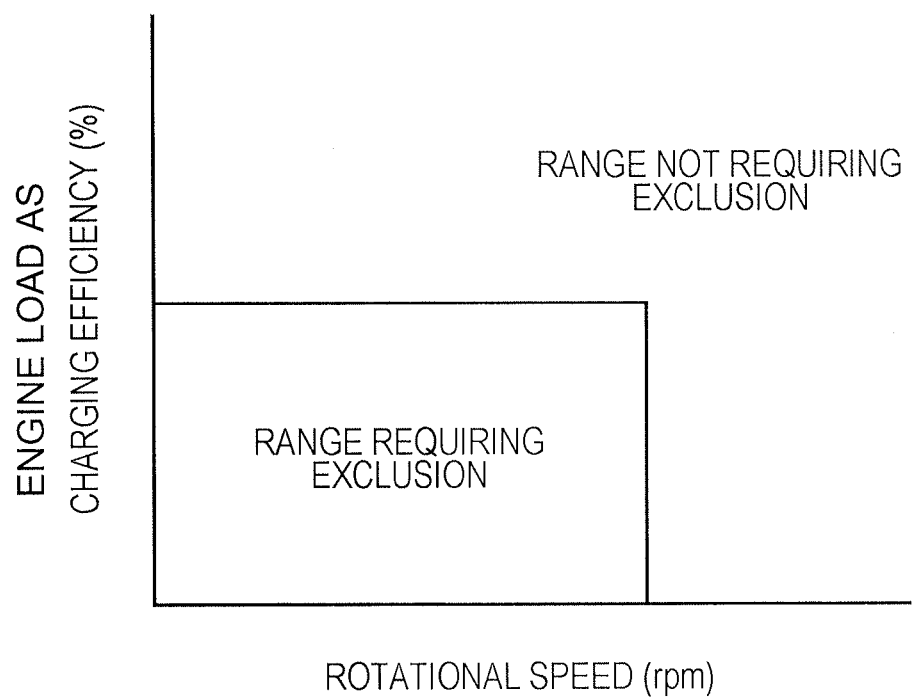
FIG. 7 is a map used for determining whether or not the natural frequency of the driving noise of the fuel injection valve is excluded.

A map as shown in FIG. 7 indicating whether or not the driving noise of the injection valve is to be excluded in terms of rotational speed and in terms of load is created by performing the above-described determination in terms of rotational speed and in terms of load for each cylinder in advance, and is stored in the controller 55. In FIG. 7, the ordinate represents the engine load in terms of charging efficiency, and the abscissa represents the rotational speed of the engine. The high rotational speed region and the high load region are the ranges not requiring exclusion, and the remainder (i.e., the low rotational speed and low load region) is the range requiring exclusion.

During computation, the knock determination control refers to the map of FIG. 7 based on the rotational speed and the load of the engine in Step S90, and the process proceeds to Step S100 or Step S110.

Figure 8:
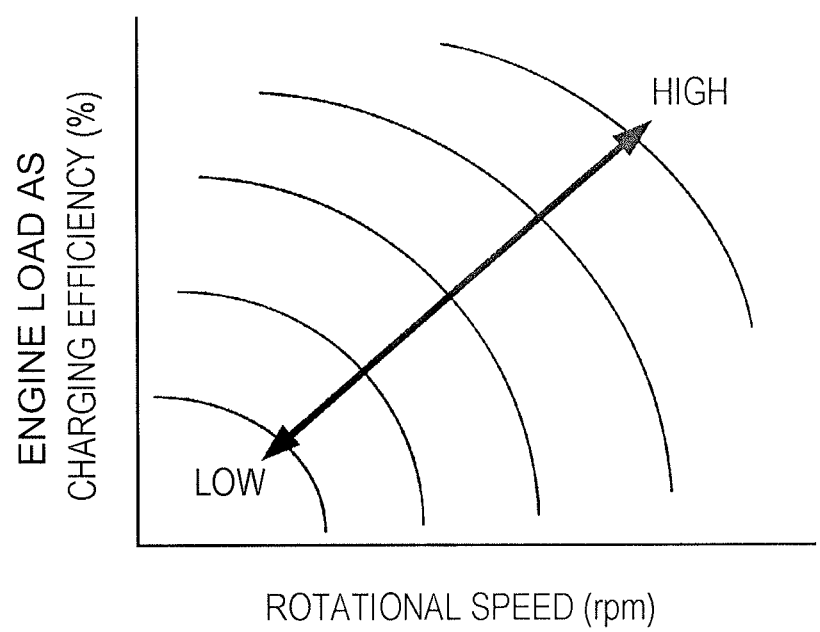
FIG. 8 is a map used for calculating a threshold for knock determination.

After the knock intensity index is calculated in Step S100 or Step S110, the threshold of the knock intensity index used for knock determination is calculated in Step S120. The threshold is about five to ten times the standard deviation of the knock intensity index measured while no knock is occurring. More specifically, a map as shown in FIG. 8 is created by calculating the thresholds in terms of rotational speed of the engine and in terms of load in advance, and is stored in the controller 55. This map is referred to using the rotational speed and the load of the engine during computation.

After the threshold is calculated, the process proceeds to Step S130, and it is determined whether or not the knock intensity index is larger than the threshold. When the knock intensity index is larger than the threshold, it is determined that knock occurred in Step S140. When the knock intensity index is smaller than or equal to the threshold, the process ends.

Although an embodiment of the present invention is incorporated into an in-cylinder direct-injection internal combustion engine in the above explanation, the embodiment can also be incorporated into a so-called port-injection internal combustion engine that injects fuel into the intake paths 30. The in-cylinder direct-injection internal combustion engine is used as an example since the engine is affected by the driving noise of the fuel injection valve more easily.

Moreover, the driving noise of the fuel injection valve serving as an example false-detection causing noise is excluded in the above explanation. However, other false-detection causing noises, for example, the driving noise of an adjustable valve device can also be excluded.

This embodiment produces the following effects.

(1) The controller 55 determines the occurrence of knock using an increased number of specific frequency regions of detection as false-detection causing noise as a proportion of background noise decreases by excluding only those frequency regions that are necessary to avoid false detection of knock due to the driving noise of the fuel injection valve, and in particular by not excluding frequency regions in which the driving noise of the fuel injection valve occurs when the signal level difference between the driving noise of the fuel injection valve and the entire background noise of the engine is low. As a result of using the maximum number of the specific frequency regions while avoiding false knock detection, the possibility of falsely determining that no knock is occurring even when knock is actually occurring is reduced, and knock can be detected with high accuracy.

(2) The controller 55 increases the number of specific frequency regions used for knock detection up to all of the frequency regions retrieved by retrieving means, resulting in an improvement in knock detection performance.

(3) The controller 55 determines the specific frequency regions by calculating the amplitude of the background noise on the basis of the rotational speed and the load of the internal combustion engine 100. Thus, the specific frequency regions can be determined on the basis of the accurate background noise in terms of operating condition of the internal combustion engine 100. Moreover, since the background noise in terms of rotational speed and in terms of load can be measured in advance, it can be determined whether or not the background noise is excluded based on the operating range of the engine. As a result, appropriate specific frequency regions can be determined through an easier computation.

(4) The controller 55 excludes a frequency region determined on the basis of the vibration intensity of the driving noise of the fuel injection valve 34 from a plurality of retrieved frequency regions in an operating range where the vibration intensity of the background noise varies in accordance with the presence or absence of the driving noise of the fuel injection valve 34. Therefore, the specific frequency regions are not reduced more than necessary, and knock can be detected with high accuracy.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A knock determining device of an internal combustion engine comprising:
   a vibration detector that detects vibration of the internal combustion engine and produces a signal corresponding to the vibration;
   an intensity computing unit that determines a frequency spectrum of the vibration having peaks of vibration intensity when knock occurs by computing a Fourier Transform of the vibration signal for each cylinder within a time window having fixed start and stop times;
   a background-noise computing unit that calculates a frequency spectrum of background noise for each cylinder during operation of the internal combustion engine detected as vibration by the vibration detector that is caused by factors other than knock, wherein the background noise is computed as a Fourier Transform based on numerical data taken from experimental measurements of noise generated by fuel injector valves and/or mechanical noise of the internal combustion engine, wherein the measurements are performed prior to operation of the internal combustion engine and stored in a data storage medium, the numerical data being read from the data storage medium by the background-noise computing unit during the calculation of the background noise;
   a frequency computing unit that determines a number of specific frequency regions from which to determine whether knock is occurring by excluding from a plurality of frequency regions certain frequency regions designated as frequency regions requiring exclusion due to a vibration intensity of false-detection causing noise as a proportion of the background noise of the engine in the certain regions, wherein the frequency regions requiring exclusion are related to frequencies of background noise and to natural frequencies of engine knock determined from a theoretical model of engine knock vibrational modes;
   a difference computing unit that computes a knock intensity index for each cylinder by:
      computing a frequency spectrum difference between the frequency spectrum of the vibration and the background noise, by subtracting the Fourier Transform of the background noise for each cylinder from the Fourier Transform of the vibration signal for each cylinder; and
      by integrating the resulting frequency spectrum difference with respect to frequency to generate the knock intensity index for each cylinder; and
   a knock determining unit that determines the occurrence of knock based on the knock intensity index that is computed by excluding the frequency regions requiring exclusion from a range of frequencies over which the frequency spectrum difference is integrated in computing the knock intensity index for each cylinder, wherein the knock determining unit performs the determining of the occurrence of knock in real time while the internal combustion engine is being operated;
   wherein the number of specific frequency regions is increased as the false-detection causing noise as a proportion of the background noise is decreased by limiting the frequency regions requiring exclusion to those of the plurality of frequency regions in which the false-detection causing noise causes an intensity of vibration in the background noise in a range that impairs the ability to detect knock, and
   wherein the frequency computing unit is further configured to:
      determine whether the engine is operating in a first operating range in which a difference in the background noise would be negligible with a driving noise of the injection valves included, and when determined negligible, to include the first operating range in the number of specific frequency regions from which to determine whether knock is occurring; and
      determine whether the engine is operating in a second operating range in which the difference in the background noise would not be negligible with the driving noise of the injection valves included, and when determined not negligible, to exclude the second operating range from the number of specific frequency regions from which to determine whether knock is occurring.

2. The knock determining device according to claim 1, wherein the number of specific frequency regions includes all of the plurality of frequency regions in which peaks of vibration intensity are located when knock occurs.

3. The knock determining device according to claim 1, wherein the background-noise computing unit calculates the background noise based on the rotational speed and the load of the internal combustion engine.

4. The knock determining device according to claim 3, wherein the background-noise computing unit calculates the background noise based on a map correlating background noise with the rotational speed and the load of the internal combustion engine.

5. The knock determining device according to claim 1, wherein the frequency computing unit excludes certain frequency regions based on the vibration intensity of the false-detection causing noise from the plurality of retrieved frequency regions in an operating range where the vibration intensity of the background noise varies in accordance with the presence or absence of the false-detection causing noise.

6. The knock determining device according to claim 1, wherein the false-detection causing noise includes the driving noise of a fuel injection valve.

7. A method for determining knock in an internal combustion engine, comprising:
   detecting vibration of the internal combustion engine and producing a signal corresponding to the vibration;
   determining a frequency spectrum having peaks of vibration intensity when knock occurs, wherein the frequency spectrum is determined by computing a Fourier Transform of the vibration signal for each cylinder within a time window having fixed start and stop times;
   calculating a frequency spectrum of background noise during operation of the internal combustion engine detected as vibration that is caused by factors other than knock, wherein the background noise is computed as a Fourier Transform based on numerical data taken from experimental measurements of noise generated by fuel injector valves and/or mechanical noise of the internal combustion engine, wherein the measurements are performed prior to operation of the internal combustion engine;
   computing a knock intensity index for each cylinder by:
      computing a frequency spectrum difference between the frequency spectrum of the vibration and the background noise, by subtracting the Fourier Transform of the background noise for each cylinder from the Fourier Transform of the vibration signal for each cylinder; and
      by integrating the resulting frequency spectrum difference with respect to frequency to generate the knock intensity index for each cylinder; and
   determining the occurrence of knock based on the knock intensity index that is computed by excluding from a plurality of frequency regions over which the frequency spectrum difference is integrated in computing the knock intensity index for each cylinder certain frequency regions designated as frequency regions requiring exclusion due to a vibration intensity of false-detection causing noise as a proportion of the background noise of the engine in the certain regions, wherein the frequency regions requiring exclusion are related to frequencies of background noise and to natural frequencies of engine knock determined from a theoretical model of engine knock vibrational modes, the determining the occurrence of knock is performed knock in real time while the internal combustion engine is being operated;
   wherein the number of specific frequency regions is increased as the false-detection causing noise as a proportion of the background noise is decreased by limiting the frequency regions requiring exclusion to those of the plurality of frequency regions in which the false-detection causing noise causes an intensity of vibration in the background noise in a range that impairs the ability to detect knock,
   determining whether the engine is operating in a first operating range in which a difference in the background noise would be negligible with a driving noise of the injection valves included, and when determined negligible, including the first operating range in the number of specific frequency regions from which to determine whether knock is occurring; and
   determining whether the engine is operating in a second operating range in which the difference in the background noise would not be negligible with the driving noise of the injection valves included, and when determined not negligible, excluding the second operating range from the number of specific frequency regions from which to determine whether knock is occurring.

8. The method for determining knock according to claim 7, wherein the number of specific frequency regions includes all of the plurality of frequency regions in which peaks of vibration intensity are located when knock occurs.

9. The method for determining knock according to claim 7, wherein the step of calculating the background noise includes calculating the background noise based on the rotational speed and the load of the internal combustion engine.

10. The method for determining knock according to claim 9, wherein the step of calculating the background noise includes calculating the background noise based on a map correlating background noise with the rotational speed and the load of the internal combustion engine.

11. The method for determining knock according to claim 7, wherein the false-detection causing noise includes the driving noise of a fuel injection valve.

12. A knock determining device of an internal combustion engine comprising:
   vibration detecting means that detects vibration of the internal combustion engine and produces a signal corresponding to the vibration;
   retrieving means that determines a frequency spectrum of the vibration having peaks of vibration intensity when knock occurs by computing a Fourier Transform of the vibration signal for each cylinder within a time window having fixed start and stop times;
   background-noise computing means that calculates background noise during operation of the internal combustion engine detected as vibration by the vibration detecting means that is caused by factors other than knock, wherein the background noise is computed as a Fourier Transform based on numerical data taken from experimental measurements of noise generated by fuel injector valves and mechanical noise of the internal combustion engine, wherein the measurements are performed prior to operation of the internal combustion engine;

frequency computing means that determines a number of specific frequency regions from which to determine whether knock is occurring by excluding from a plurality of frequency regions certain frequency regions designated as frequency regions requiring exclusion due to a vibration intensity of false-detection causing noise as a proportion of the background noise of the engine in the certain regions, wherein the frequency regions requiring exclusion are related to frequencies of background noise and to natural frequencies of engine knock determined from a theoretical model of engine knock vibrational modes; and a difference computing means that computes a knock intensity index for each cylinder by:
  computing a frequency spectrum difference between the frequency spectrum of the vibration and the background noise, by subtracting the Fourier Transform of the background noise for each cylinder from the Fourier Transform of the vibration signal for each cylinder; and
  by integrating the resulting frequency spectrum difference with respect to frequency to generate the knock intensity index for each cylinder; and a knock determining means that determines the occurrence of knock based on the knock intensity index that is computed by excluding the frequency regions requiring exclusion from a range of frequencies over which the frequency spectrum difference is integrated in computing the knock intensity index for each cylinder, wherein the knock determining means performs the determining of the occurrence of knock in real time while the internal combustion engine is being operated;

wherein the number of specific frequency regions is increased as the false-detection causing noise as a proportion of the background noise is decreased by limiting the frequency regions requiring exclusion to those of the plurality of frequency regions in which the false-detection causing noise causes an intensity of vibration in the background noise in a range that impairs the ability to detect knock, and wherein the frequency computing means is further configured to:
  determine whether the engine is operating in a first operating range in which a difference in the background noise would be negligible with a driving noise of the injection valves included, and when determined negligible, to include the first operating range in the number of specific frequency regions from which to determine whether knock is occurring; and
  determine whether the engine is operating in a second operating range in which the difference in the background noise would not be negligible with the driving noise of the injection valves included, and when determined not negligible, to exclude the second operating range from the number of specific frequency regions from which to determine whether knock is occurring.

13. The knock determining device according to claim 1, wherein the number of specific frequency regions is increased, by including a frequency range in which the noise caused by the internal combustion engine is large so as to drown out the false detection causing noise, resulting in a decrease of the false-detection causing noise as proportion of the background noise.

14. The knock determining device according to claim 13, wherein the false-detection causing noise includes the driving noise of a fuel injection valve.

15. The knock determining device according to claim 14, wherein the false-detection causing noise further includes the driving force of an adjustable valve device.

16. The knock determining device according to claim 1, wherein the frequency computing unit is configured to determine whether the engine is operating in the first operating range or the second operating range by (a) comparing (i) the background noise without the driving noise of the injection valves included with (ii) the background noise with the driving noise of the injection valves at a particular rotational speed and load of the engine while no knock is occurring included, (b) determining that the particular rotational speed and load are in the second operating range when the difference is negligible between (i) the background noise without the driving noise of the injection valves included and (ii) the background noise with the driving noise of the injection valves at the particular rotational speed and load of the engine while no knock is occurring included, and (c) determining that the particular rotational speed and load of the engine are in the first operating range when the difference is not negligible between (i) the background noise without the driving noise of the injection valves included and (ii) the background noise with the driving noise of the injection valves at the particular rotational speed and load of the engine while no knock is occurring included.

17. The method for determining knock according to claim 7, wherein the determining of whether the engine is operating in the first operating range or the second operating range comprises (a) comparing (i) the background noise without the driving noise of the injection valves included with (ii) the background noise with the driving noise of the injection valves at a particular rotational speed and load of the engine while no knock is occurring included, (b) determining that the particular rotational speed and load are in the second operating range when the difference is negligible between (i) the background noise without the driving noise of the injection valves included and (ii) the background noise with the driving noise of the injection valves at the particular rotational speed and load of the engine while no knock is occurring included, and (c) determining that the particular rotational speed and load of the engine are in the first operating range when the difference is not negligible between (i) the background noise without the driving noise of the injection valves included and (ii) the background noise with the driving noise of the injection valves at the particular rotational speed and load of the engine while no knock is occurring included.

18. The knock determining device according to claim 12, wherein the frequency computing means is configured to determine whether the engine is operating in the first operating range or the second operating range by (a) comparing (i) the background noise without the driving noise of the injection valves included with (ii) the background noise with the driving noise of the injection valves at a particular rotational speed and load of the engine while no knock is occurring included, (b) determining that the particular rotational speed and load are in the second operating range when the difference is negligible between (i) the background noise without the driving noise of the injection valves included and (ii) the background noise with the driving noise of the injection valves at the particular rotational speed and load of the engine while no knock is occurring included, and (c) determining that the particular rotational speed and load of the engine are in the first operating range when the difference is not negligible between (i) the background noise without the driving noise of the injection valves included and (ii) the background noise with the driving noise of the injection valves at the particular rotational speed and load of the engine while no knock is occurring included.

* * * * *